UNITED STATES PATENT OFFICE.

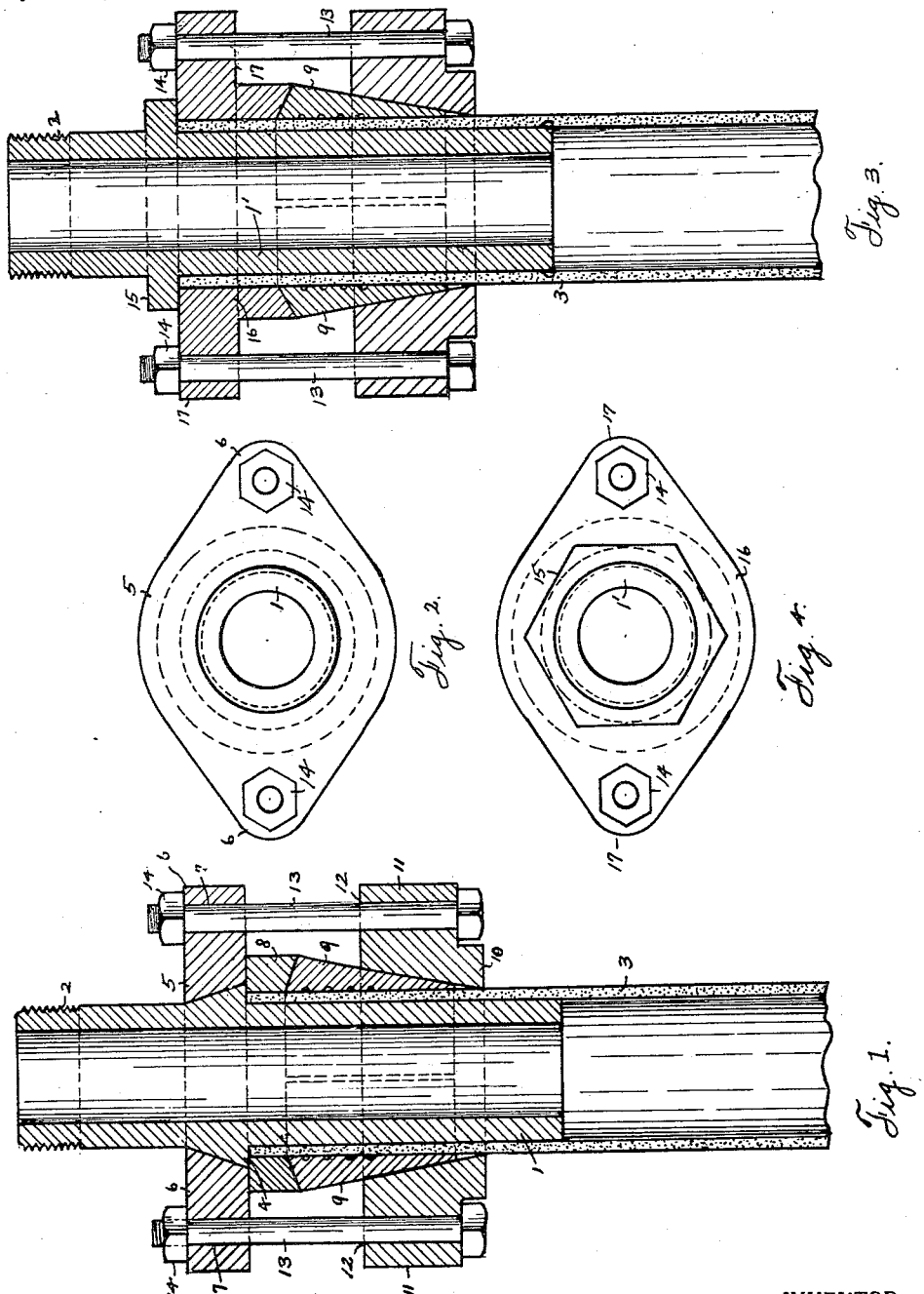

CLARENCE D. BENNETT, OF GOOSE CREEK, TEXAS.

HOSE-CLAMP.

1,244,577.  Specification of Letters Patent.  Patented Oct. 30, 1917.

Application filed March 1, 1917. Serial No. 151,640.

*To all whom it may concern:*

Be it known that I, CLARENCE D. BENNETT, a citizen of the United States, residing at Goose Creek, in the county of Harris and State of Texas, have invented certain new and useful Improvements in Hose-Clamps, of which the following is a specification.

This invention relates to new and useful improvements in a hose clamp.

The object of the invention is to provide a device of the character described which will securely clamp the end of a hose to the nipple whereby the hose is connected to a swivel, pump or wherever else it is desired to connect the same. The clamp is used, however, most commonly in connection with securing the hose to a nipple which in turn is connected to a swivel commonly used in drilling oil and other deep wells.

In the drilling of wells the swivel is usually suspended from the top of the derrick and the hose connected thereto by means of the nipple referred to, but on account of the pressure of fluid in the hose and the weight thereof, the hose is often detached from the nipple end, together with its metallic connections and falls down upon the derrick floor and is liable to injure the workmen.

It is the object of this invention to provide a clamp that will prevent the separation of the hose from the nipple and in its preferred form one so constructed that the metallic parts will be fastened to the nipple and will not fall, in case of the detachment of the hose.

With the above and other objects in view the invention has particular relation to certain novel features of construction, arrangement of parts and use, an example of which is given in this specification and illustrated in the accompanying drawings wherein:

Figure 1 is a longitudinal sectional view of the preferred form of clamp.

Fig. 2 is an end view thereof.

Fig. 3 is a longitudinal sectional view of a modified form thereof, and

Fig. 4 is an end view of said modified form.

Referring now more particularly to the drawings wherein like numerals of reference designate similar parts in each of the figures, the numeral 1 refers to a nipple one end of which is threaded at 2 and, in use, is screwed into the corresponding part of the swivel. The hose 3 fits over the opposite end of said nipple and its free end abuts against the abrupt side of the annular shoulder 4, which is integral with said nipple, the other side of this shoulder is sloping, the shoulder being wedge shaped in cross section and a ring 5 is fitted over the nipple and rests against the sloping face of said shoulder 4, said ring being provided with the lateral ears 6, 6, having the corresponding orifices 7, 7, therethrough.

Surrounding the end of the hose and resting against the abrupt side of the shoulder 4 is the ring 8, provided to support the wedge shaped slips 9. These slips are arcuate in cross section and fit around the hose and the adjacent side of the ring 8 is slightly concave to conform to and receive the adjoining ends of the slips. The inner sides of these slips are milled or roughened so as to engage with the hose and a clamp member 10 is provided adapted to fit over the slips and the central orifice of which converges to conform to the contour of said slips. This clamp member has lateral ears 11, 11, having the orifices 12, 12, alined with the corresponding orifices 7, 7, of ears 6, 6. Bolts 13, 13, pass through these corresponding orifices whose free ends are threaded to receive the nuts 14, 14, by means of which the clamp member 10 may be forced toward the ring 5 so as to firmly clamp the hose end to the nipple. In case said hose end should become detached from the nipple, it will fall to the derrick floor but all of the metallic parts will be sustained by the nipple, thus lessening the liability of injuring the workman.

In the modified form I have shown a nipple 1' now in common use, with a modified form of my clamp applied thereto. This nipple has the shoulder 15, preferably square or hexagonal so as to receive a wrench. The hose 3 is fitted over the nipple end and its free end rests against said shoulder. Surrounding the free end of the hose is the ring 16 having the lateral ears 17, 17. The slips 9 in this form of device are clamped against the hose by the clamp member 10 as hereinbefore explained, said member being secured in position by means of the bolts 13, 13, as hereinbefore specified.

While the two forms of clamp herein described are specially adapted for use in connecting a hose to a swivel, they may also be used in any place where it is desired to effect hose connections.

What I claim is:

1. In a device of the character described, the combination with a nipple having an annular shoulder, of a hose fitted over one end of the nipple, a ring fitted over the nipple and resting against one side of said shoulder, a ring fitted around the hose end and resting against the opposite side of said shoulder, slips arcuate in cross section, fitted around the hose and supported upon said last mentioned ring, a clamp member fitted around and clamping said slips and means connecting the first mentioned ring and clamp member.

2. In a device of the character described, the combination with a nipple having an annular shoulder, of a hose fitted over one end of the nipple, a ring fitted over the nipple and resting against one side of said shoulder, slips arcuate in cross section fitted around the hose, a seat provided to receive the adjacent ends of said slips, a clamp member fitted around and clamping said slips and means connecting said ring and clamp member.

In testimony whereof I have signed my name to this specification in the presence of two subscribing witnesses.

CLARENCE D. BENNETT.

Witnesses:
J. F. MATHEWS,
GEORGE KNIGHT.

Copies of this patent may be obtained for five cents each, by addressing the "Commissioner of Patents, Washington, D. C."